United States Patent
Chen

(10) Patent No.: US 6,805,368 B1
(45) Date of Patent: Oct. 19, 2004

(54) SCOOTER

(75) Inventor: Ting-Hsing Chen, Tainan Hsien (TW)

(73) Assignee: Far Great Plastics Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 10/638,411

(22) Filed: Aug. 12, 2003

(51) Int. Cl.[7] .............................................. B62M 1/00
(52) U.S. Cl. .............................. 280/87.041; 280/87.05
(58) Field of Search ................. 280/87.041, 87.021, 280/87.042, 87.01, 87.03, 12.1, 7.12, 7.13, 7.14, 87.05, 206, 638, 639, 641

(56) References Cited

U.S. PATENT DOCUMENTS

| | | | | |
|---|---|---|---|---|
| 2,027,254 A | * | 1/1936 | Vogt | 280/87.042 |
| D176,725 S | * | 1/1956 | Laibow et al. | D21/423 |
| 3,565,454 A | * | 2/1971 | Stevenson et al. | 280/87.042 |
| 4,093,525 A | * | 6/1978 | Cunningham | 205/511 |
| 4,274,647 A | * | 6/1981 | Drake, Jr. | 280/87.042 |
| 4,761,014 A | * | 8/1988 | Huang | 280/258 |
| 6,158,751 A | * | 12/2000 | Wu et al. | 280/87.041 |
| 6,161,860 A | * | 12/2000 | Corneau | 280/642 |
| 6,739,606 B2 | * | 5/2004 | Rappaport | 280/87.041 |
| 2002/0070519 A1 | * | 6/2002 | Rappaport | 280/87.041 |
| 2002/0096846 A1 | * | 7/2002 | Chen | 280/87.041 |
| 2002/0109323 A1 | * | 8/2002 | Darnell | 280/87.041 |
| 2002/0117826 A1 | * | 8/2002 | Lee | 280/87.041 |
| 2002/0167146 A1 | * | 11/2002 | Chang | 280/87.041 |
| 2004/0017056 A1 | * | 1/2004 | Chen | 280/87.041 |

* cited by examiner

*Primary Examiner*—Bryan Fischmann
*Assistant Examiner*—J. Allen Shriver
(74) *Attorney, Agent, or Firm*—Rosenberg, Klein & Lee

(57) ABSTRACT

A scooter includes a skateboard, a front fork, and fastened members. The skateboard has a fixture member at front bottom with a pair of tubes at respective sides. The front fork has a fixture with a pair of rods on respective sides. The rods of the fixture of the front fork are secured to the tubes of the fixture member of the skateboard by means of the fastened members.

3 Claims, 7 Drawing Sheets

SCOOTER

FIELD OF THE INVENTION

This invention relates to a scooter, and more particularly to a combination of a scooter and a skateboard.

BACKGROUND OF THE INVENTION

It has been for a while since a skateboard was put out on the market. The board has no handle and is not easy to control, so a new design was derived. It has a handle at the front for a user to grab to control the moving direction and also works as a support to the user. However, this design requires more space to store and to carry.

Therefore, the inventor has derived the present invention to improve the function and still keep its character.

SUMMARY OF THE INVENTION

It is the primary object of the present invention to provide a scooter, which is easy to assemble and disassemble.

It is another object of the present invention to provide the scooter, which requires less space to store and is easy to carry.

It is a further object of the present invention to provide the scooter, which is safe in use.

DETAILED DESCRIPTION OF THE PREFERRED EMBODIMENTS

Figure 1:
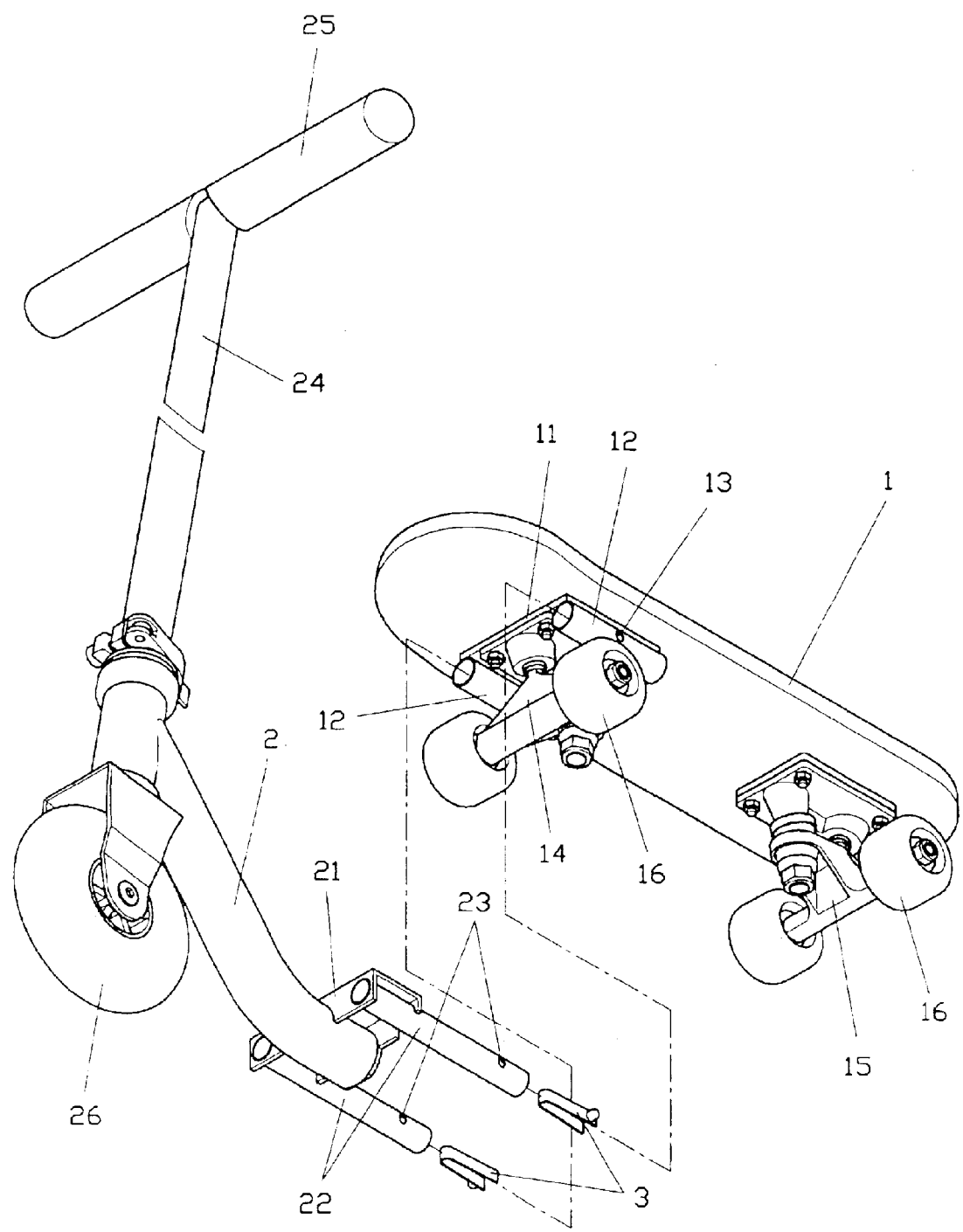
FIG. 1 is an exploded view of a first embodiment of the present invention.
Figure 2:
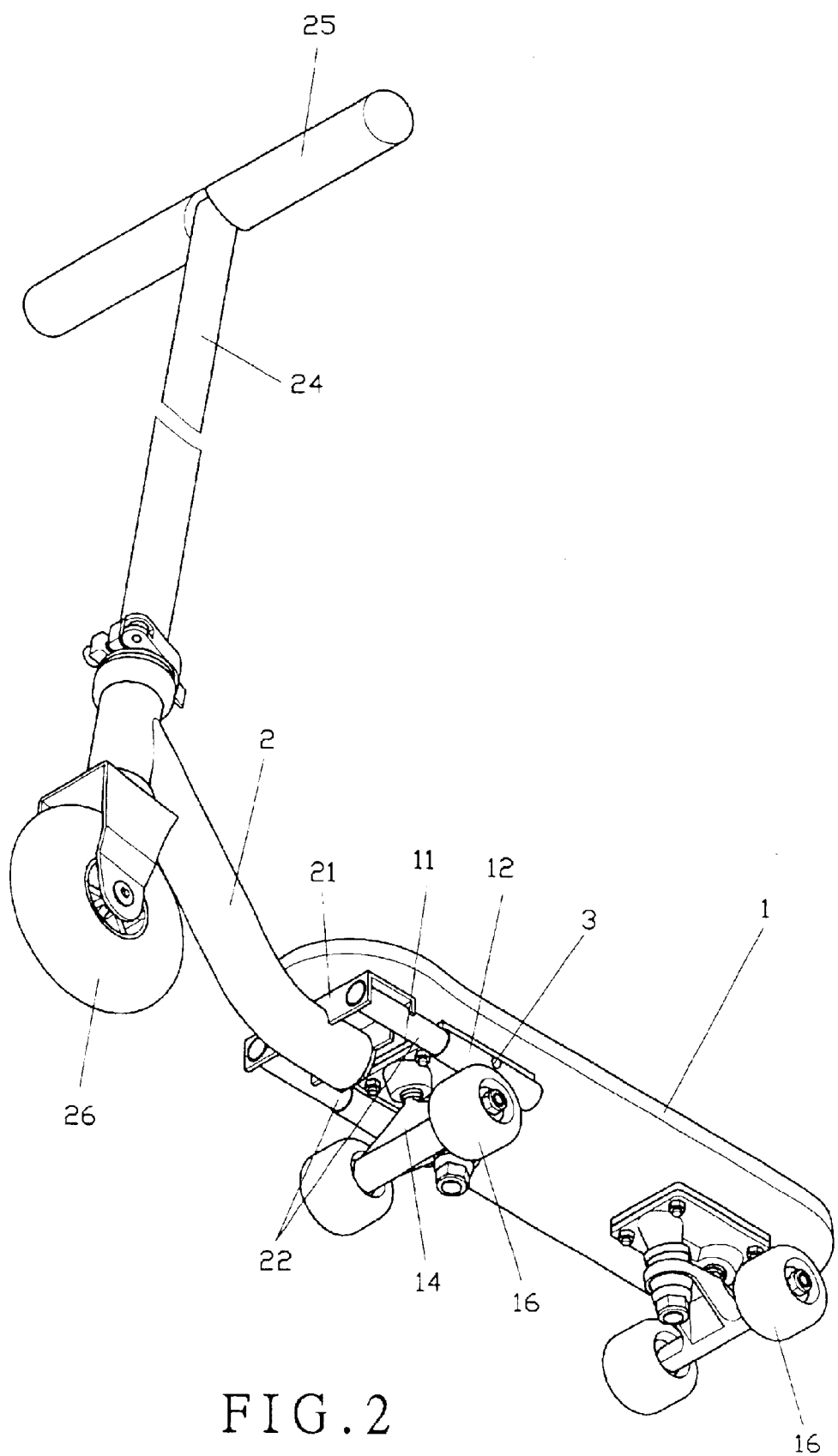
FIG. 2 is a perspective view of the first embodiment of the present invention.

As shown in FIGS. 1 and 2, the present invention comprises a skateboard 1, a front fork 2 and fastened members 3.

The skateboard 1 comprises a fixture member 11 attached to the front bottom thereof. The fixture member 11 has a pair of tubes 12 at respective sides. Each tube 12 has a through hole 13. A pair of wheel trucks 14 and 15 are formed on the front and the rear of the bottom of the skateboard 1, respectively with wheels 16 secured thereon. The wheel truck 14 is secured immediate underneath the fixture member 11.

The front fork 2 is adapted for connection with the skateboard 1. The front fork 2 includes a fixture 21 with a pair of rods 22 at respective sides. Each rod 22 has a through hole 23. The front fork 2 further comprises a handle bar 24 with a handle 25 on the top and a wheel 26 at the bottom thereof. The handle bar 24 is fastened in a free pivotal manner.

The fastened members 3 are made of elastic material and adapted to secure the rods 22 of the front fork 2 to the tubes 12 of the skateboard 1.

Figure 3:
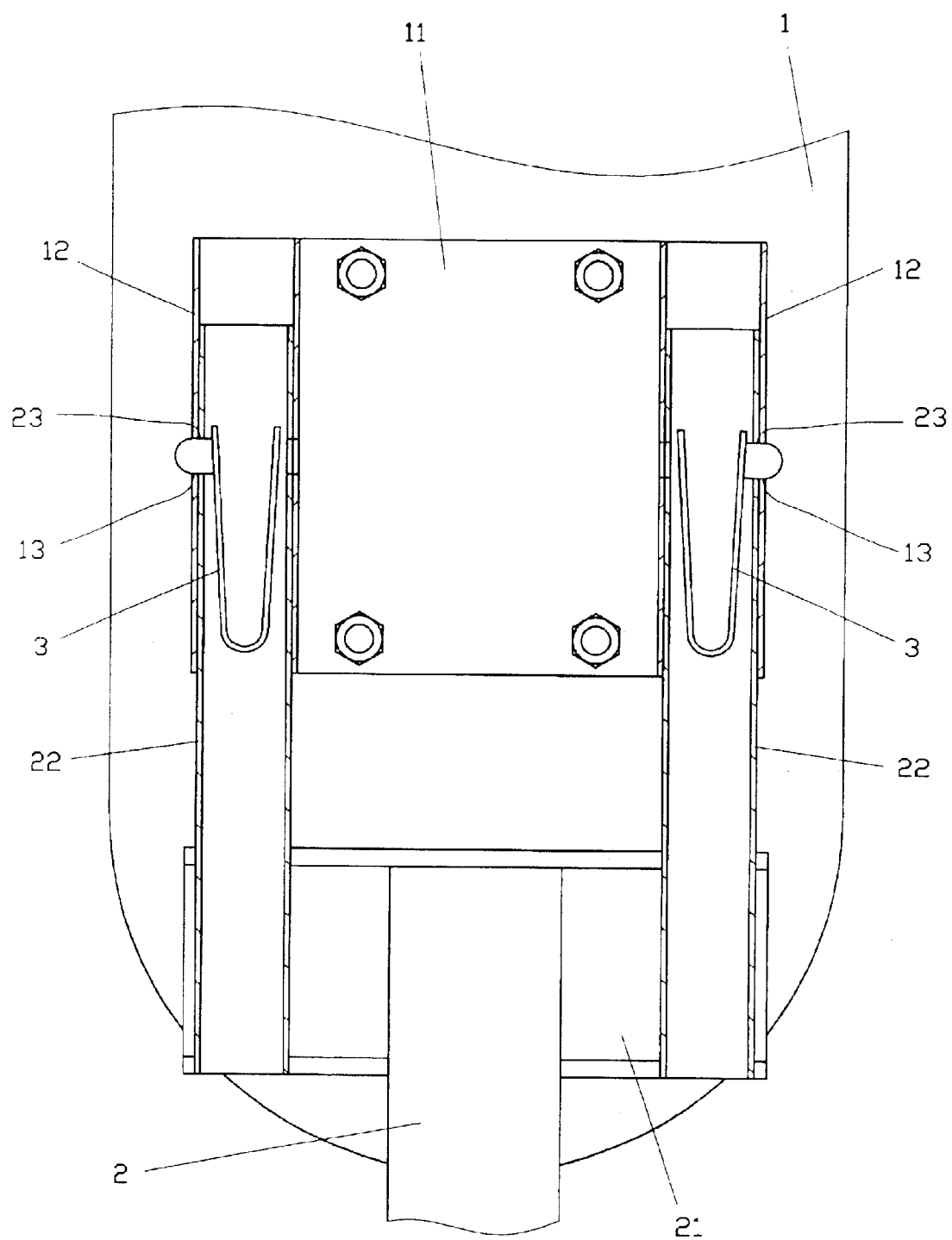
FIG. 3 is an enlarged view of fastened members of the first embodiment of the present invention, partially sectioned.

To assemble the present invention, as shown in FIGS. 2 and 3, the fastened members 3 are inserted into the rods 22 and extending outward from the through holes 23. The rods 22 of the fixture 21 are inserted into the tubes 12 of the fixture member 11 with the fastened members 3 extending through the through holes 13. This secures the skateboard 1 to the front fork 2.

To operate the present invention, a user stands on the skateboard 1 with both hands holding the handle 25, and the user is ready to roll. When the user decides to skate, he/she just presses the fastened members 3 to release the rods 22 from the tubes 12, and the skateboard 1 is also detached from the front fork 2. The user is able to skate with the skateboard 1. The detachment of the skateboard 1 and the front fork 2 is easy to store and to carry.

Figure 4:
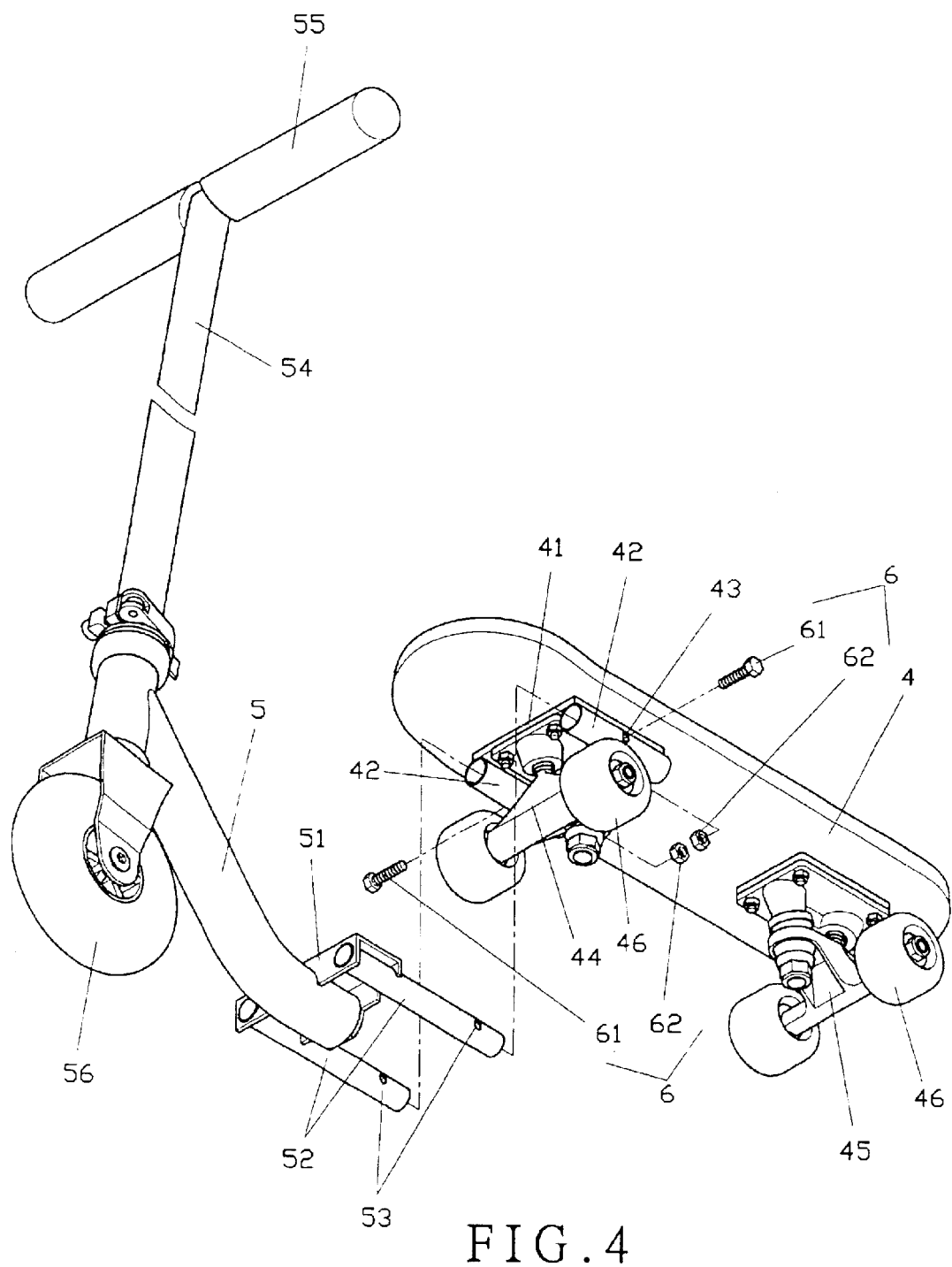
FIG. 4 is an exploded view of a second embodiment of the present invention.
Figure 5:
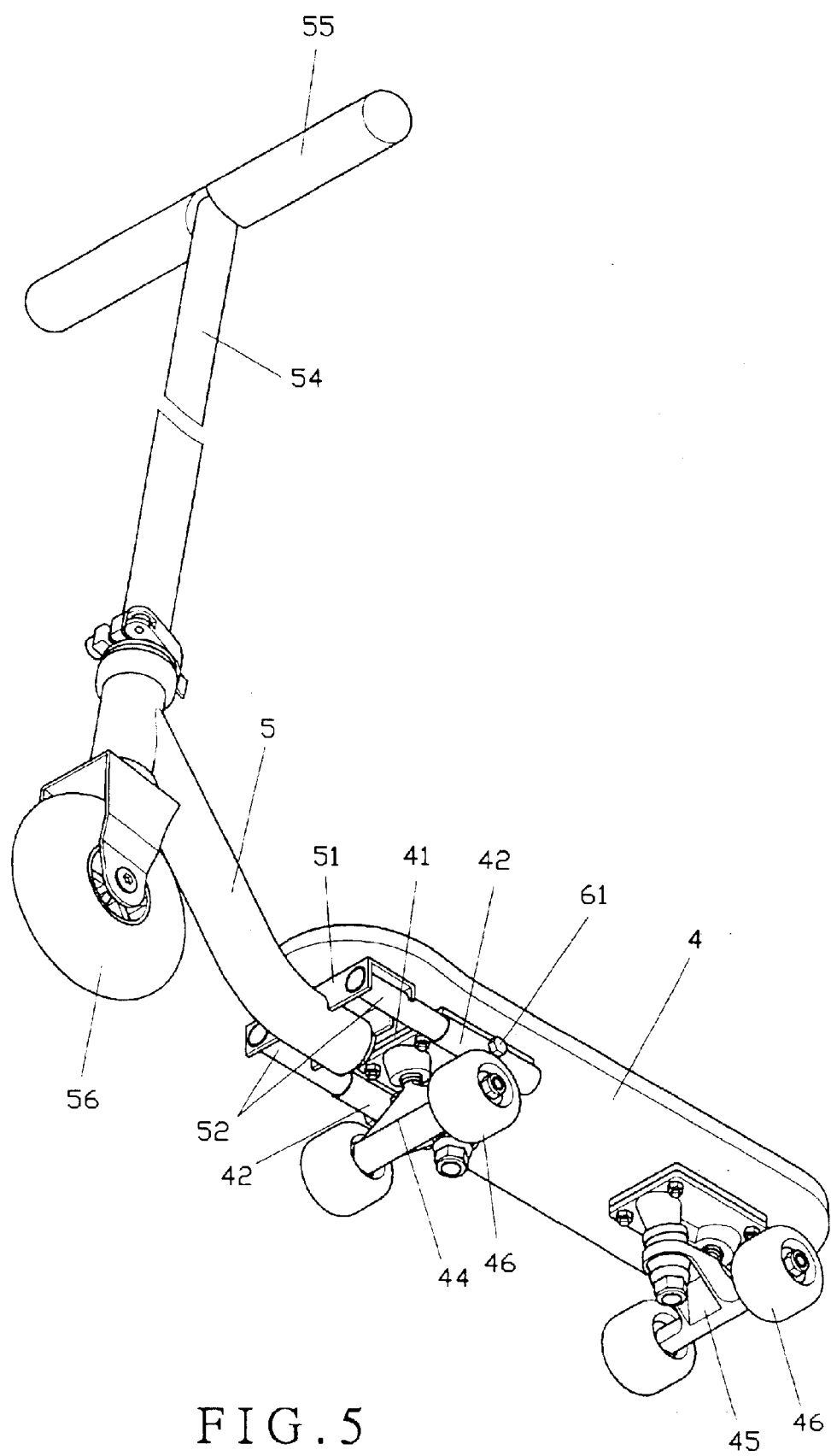
FIG. 5 is a perspective view of FIG. 4.
Figure 6:
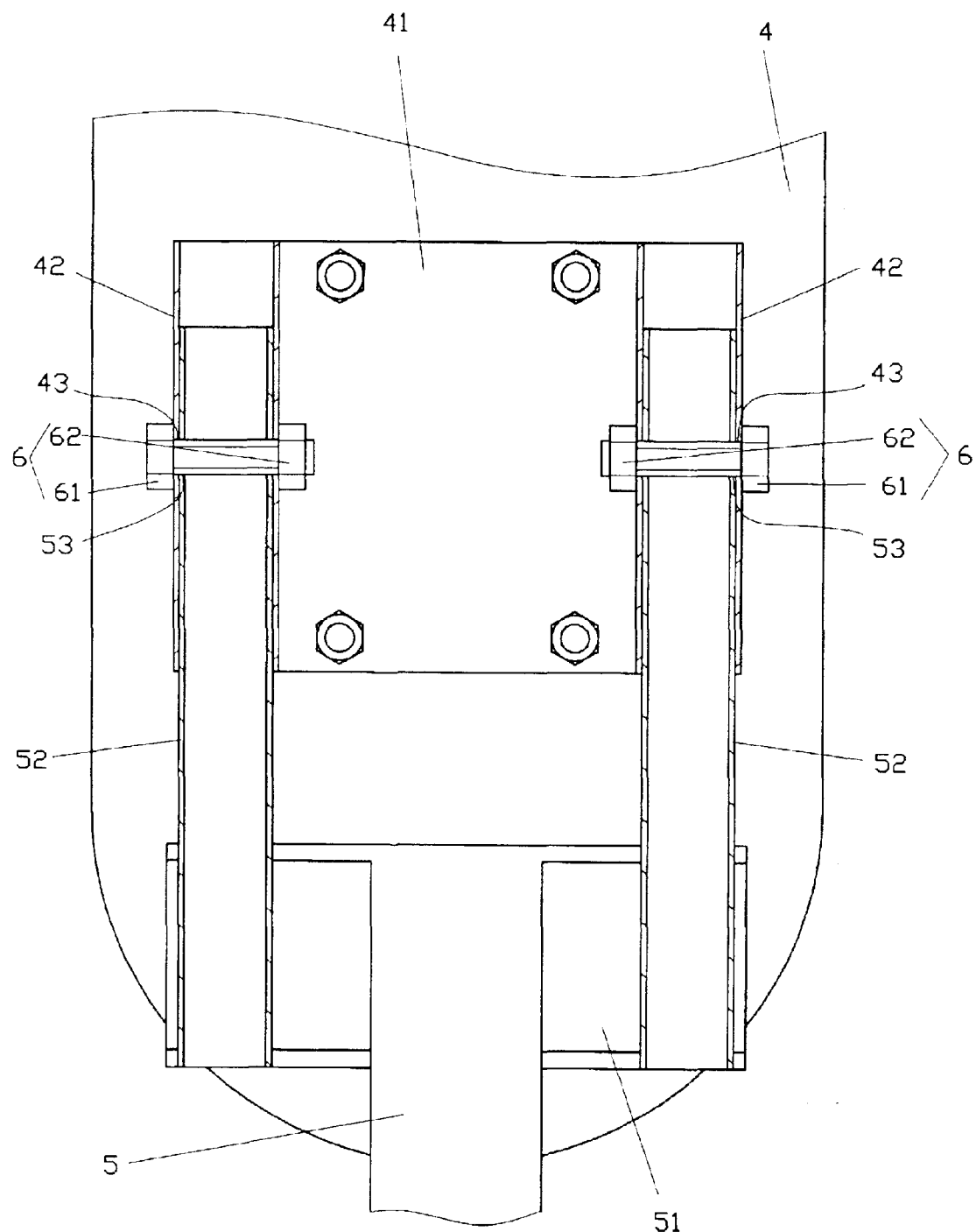
FIG. 6 is an enlarged view of fastened members of the second embodiment of the present invention, partially sectioned.

FIG. 4 shows a second embodiment of the present invention, which comprises a skateboard 4 with a fixture member 41 at the front bottom thereof. The fixture member 41 has a pair of tubes 42 at respective sides. Each tube 42 has a through hole 43 thereon. A pair of wheel trucks 44 and 45 are secured at the front and the rear bottom of the skateboard 4 thereof. The wheel truck 44 is secured immediate underneath the fixture member 41. A pair of wheels 46 are pivoted to the front and the rear trucks 44 and 45 thereof.

A front fork 5 is adapted to connect the skateboard 4. The front fork 5 includes a fixture 51 with a pair of rods 52 at respective sides thereof. Each rod 52 has a through hole 53 thereat. The front fork S has a handle bar 54 with a handle 55 secured to the top and a wheel 56 at the bottom end thereof.

Fastened members 6 are adapted to secure the fixture member 41 and the fixture 51 together. The fasteners are composed of bolts 61 and nuts 62.

To assemble the second embodiment of the present invention, the rods 52 of the fixture 5 are inserted into the tubes 42 of the fixture 41. The bolts 61 of the fastened members 6 are inserted through the through holes 43 and 53 and secured with the nuts 62. This secures the fixture member 41 to the fixture 51. Thus the skateboard 4 and the front fork 5 are secured as one unit.

To operate the second embodiment of the present invention, a user can stand on the skateboard 4 with both hands holding the handle 55 to roll. By releasing the bolts 61 and the nuts 62, the rods 52 of the fixture 5 are detached from the tubes 42 of the fixture member 4. Thus the user can use the skateboard 4 to skate. This detachment makes the present invention easy to store and to carry.

Figure 7:
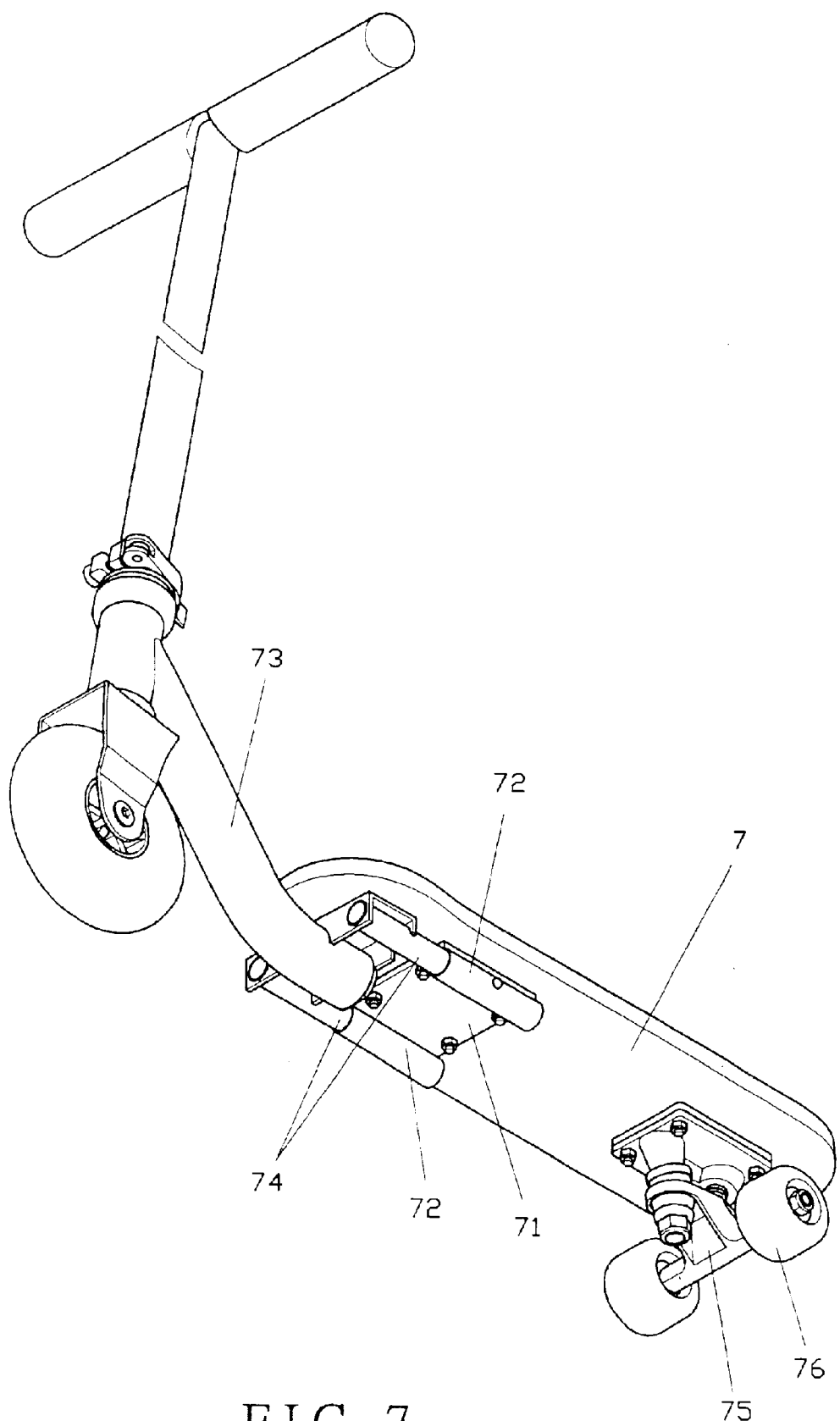
FIG. 7 is a perspective view of a third embodiment.

FIG. 7 shows a third embodiment of the present invention, which comprises a fixture member 71 at the front bottom of a skateboard 7. The fixture member 71 comprises a pair of tubes 72 for a pair of rods 74 of a front fork 73 to insert and secure therein. The rear bottom of the skateboard 7 is provided with a wheel truck 75 having wheels 76. This design minimizes one set of wheel truck.

I claim:

1. A scooter comprises a skateboard, a front fork and fastened members, wherein said skateboard comprising wheel trucks at front and rear bottom ends thereof with wheels pivoted to said wheel trucks, said front fork comprising a handle bar with a handle at a top portion and a wheel at a bottom end of said handle bar;

said skateboard comprising a fixture member at a front bottom with a pair of tubes at respective sides thereof, each said tube comprising a through hole therein, said front fork comprising a fixture with a pair of rods at respective sides, each said rod having a through hole therein, said rods of said fixture being secured to said tubes of said fixture member by means of said fastened members.

2. The scooter as recited in claim 1, wherein said fastened members are elastic clips.

3. The scooter as recited in claim 1, wherein said fastened members are bolts and nuts.

* * * * *